No. 895,457.
PATENTED AUG. 11, 1908.
C. G. HAWLEY.
AUTOMATIC SHOVELING MACHINE.
APPLICATION FILED OCT. 26, 1906.
6 SHEETS—SHEET 1.
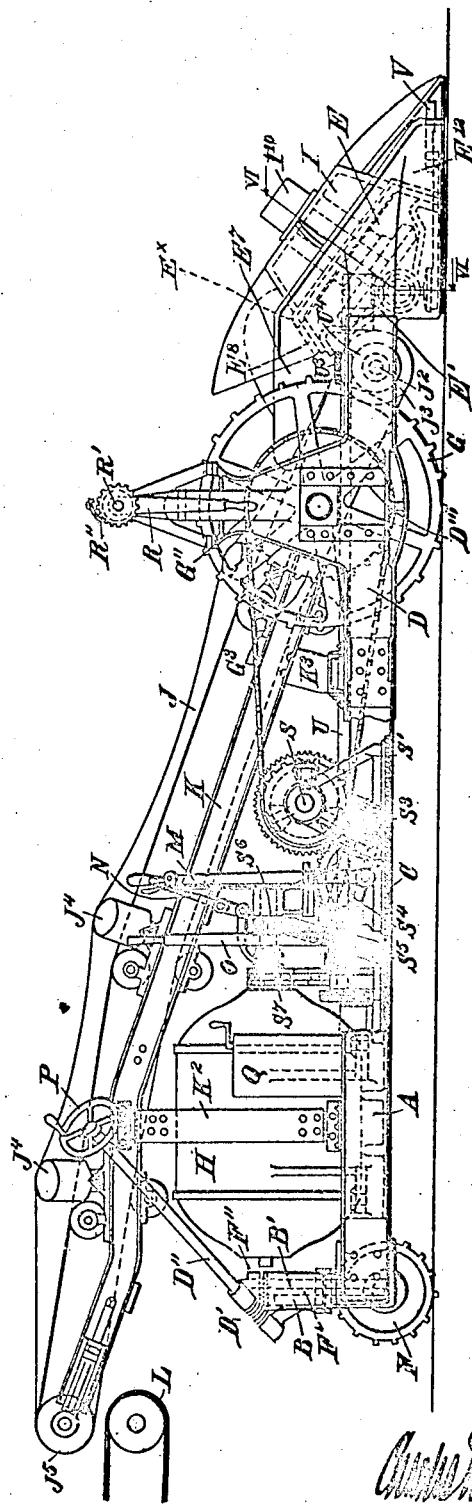

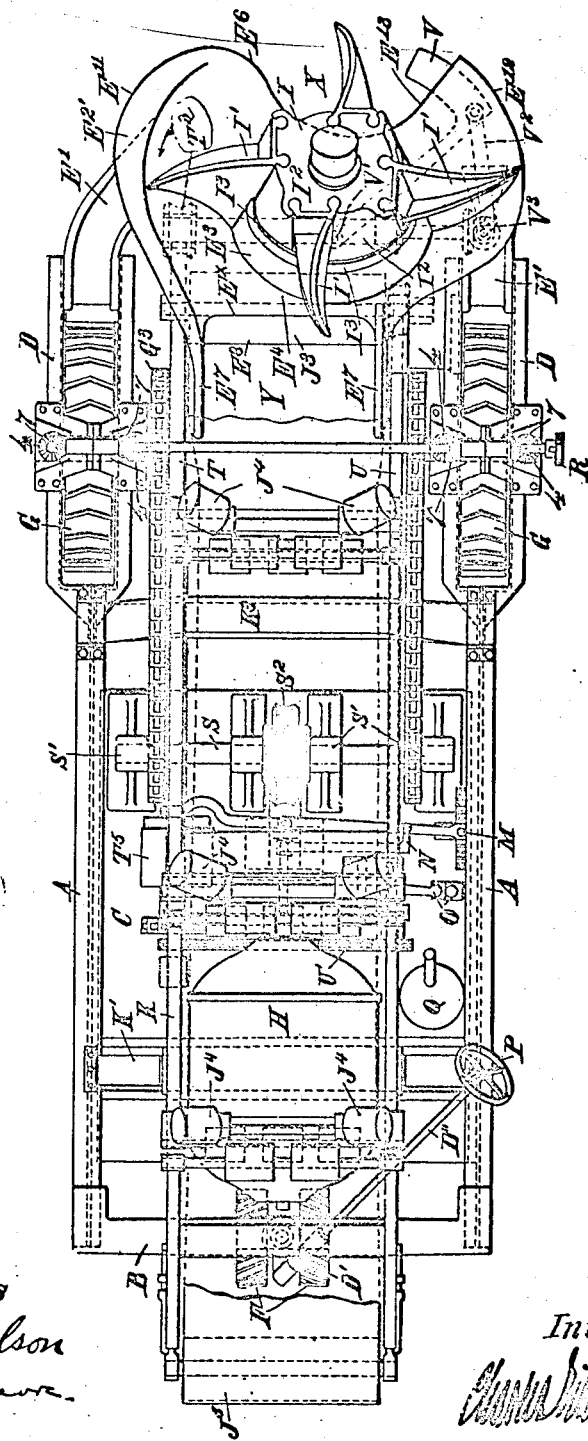

No. 895,457. PATENTED AUG. 11, 1908.
C. G. HAWLEY.
AUTOMATIC SHOVELING MACHINE.
APPLICATION FILED OCT. 26, 1906.
6 SHEETS—SHEET 3.
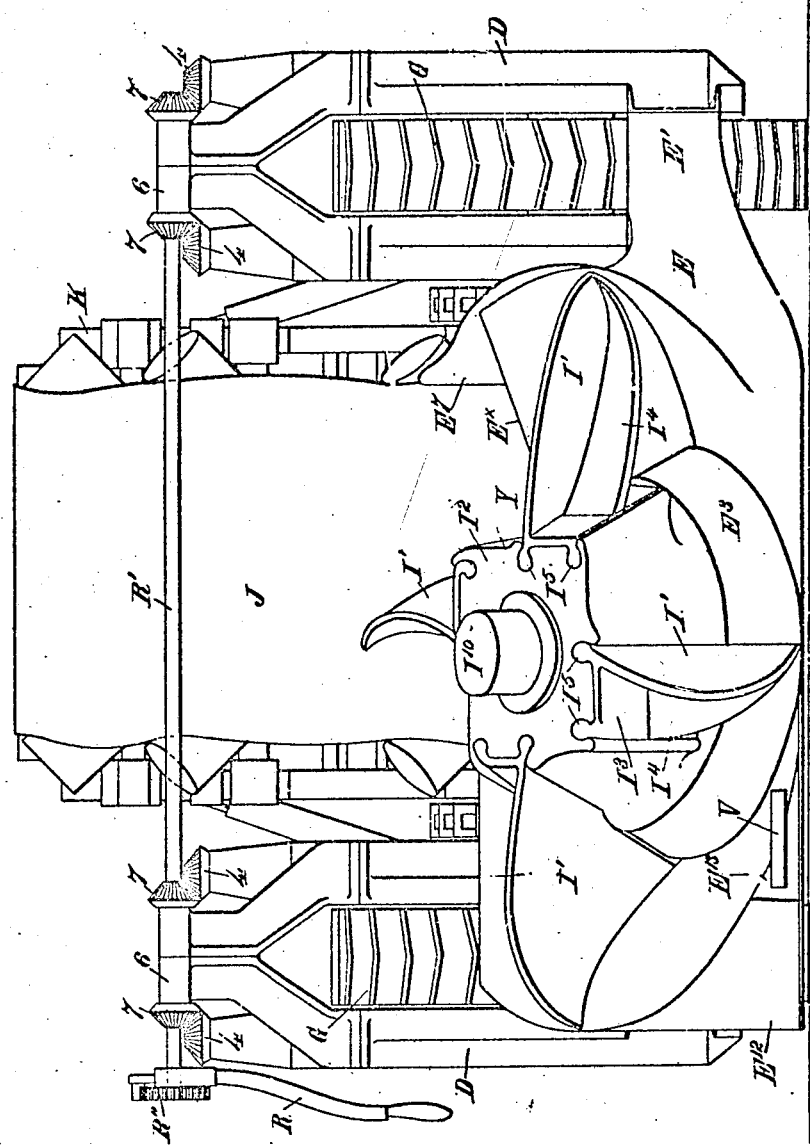
Fig. III.
Witnesses
Inventor

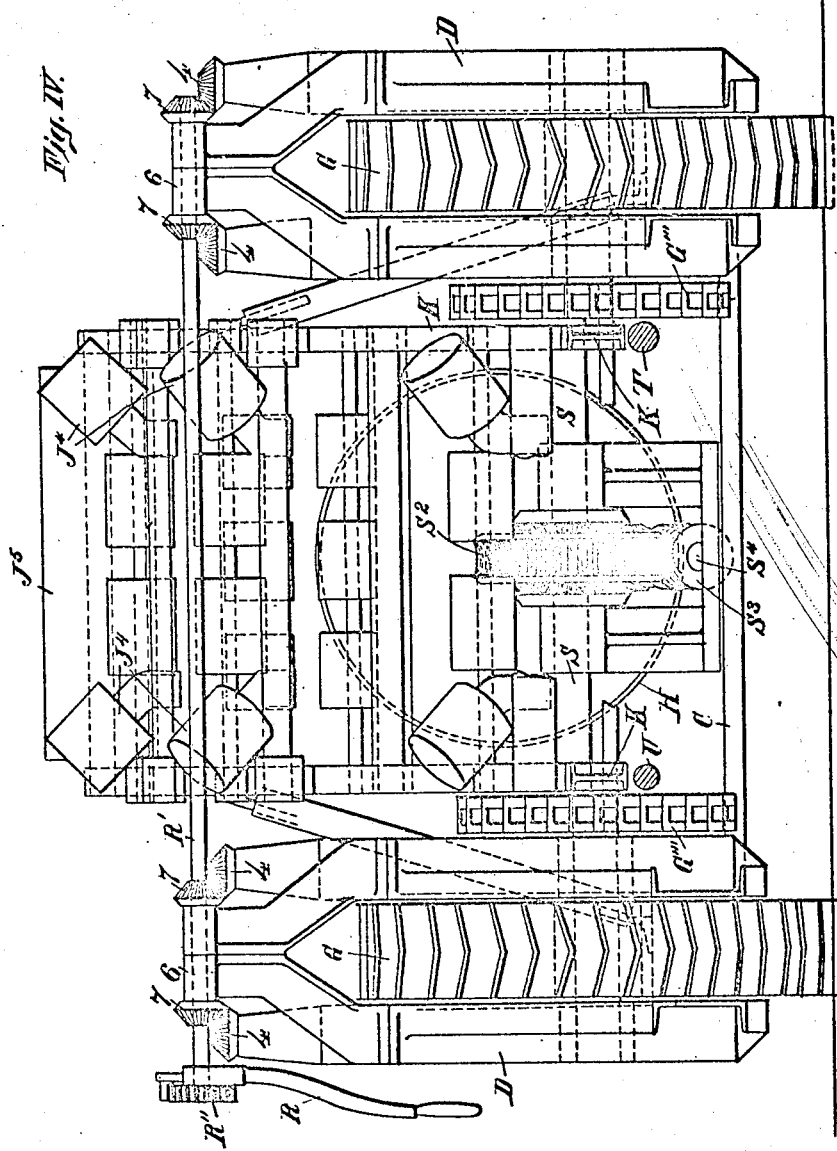

No. 895,457. PATENTED AUG. 11, 1908.
C. G. HAWLEY.
AUTOMATIC SHOVELING MACHINE.
APPLICATION FILED OCT. 26, 1906.
6 SHEETS—SHEET 5.
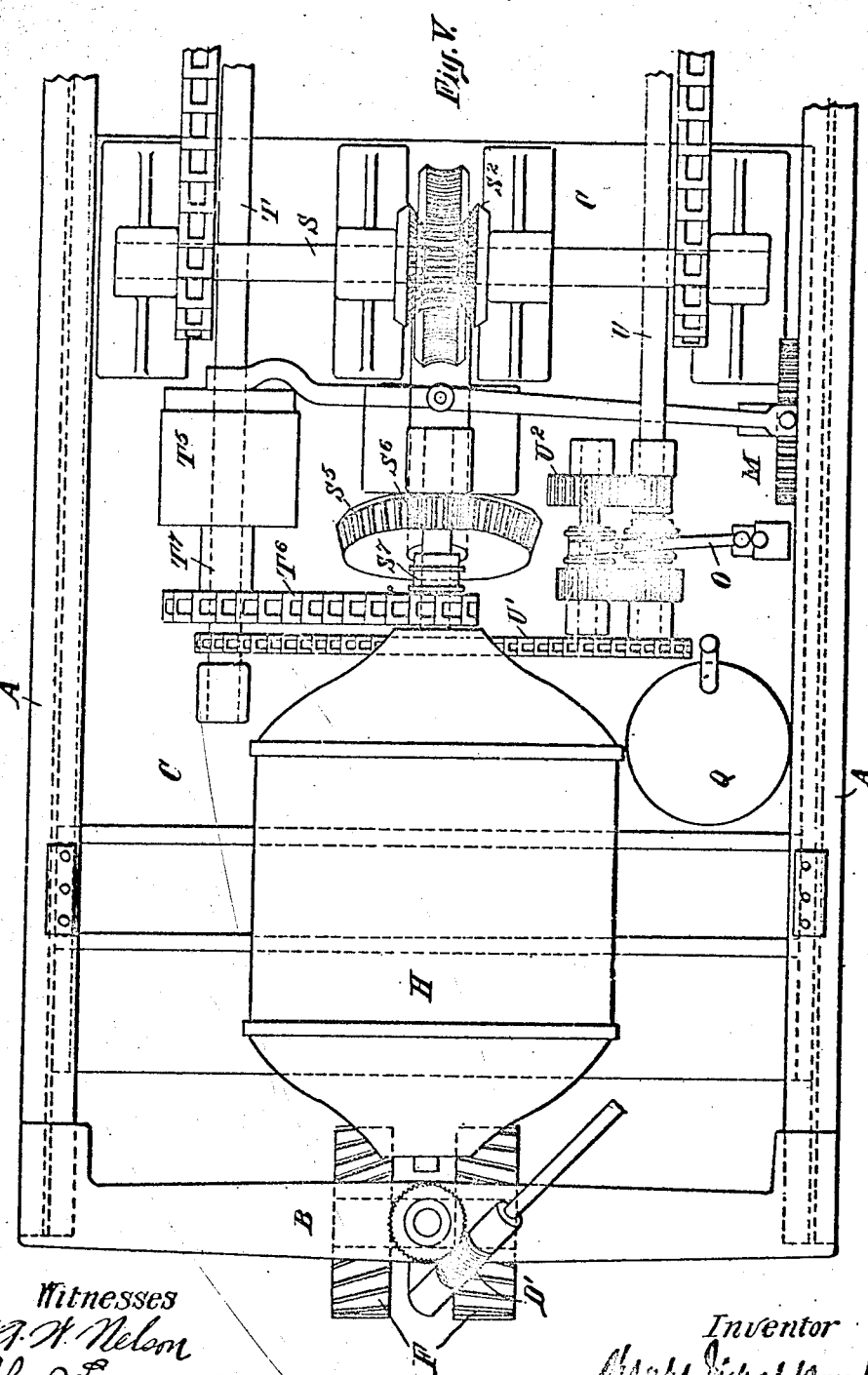
Witnesses
Inventor No. 895,457. PATENTED AUG. 11, 1908.
C. G. HAWLEY.
AUTOMATIC SHOVELING MACHINE.
APPLICATION FILED OCT. 26, 1906.
6 SHEETS—SHEET 6.
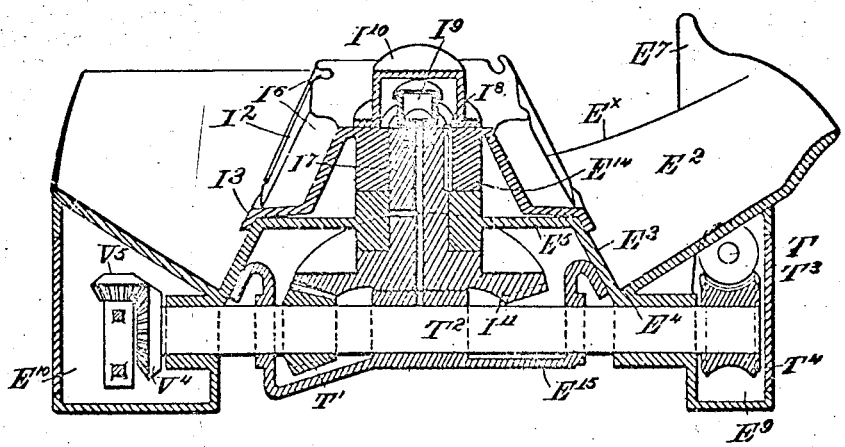
Fig. VI.
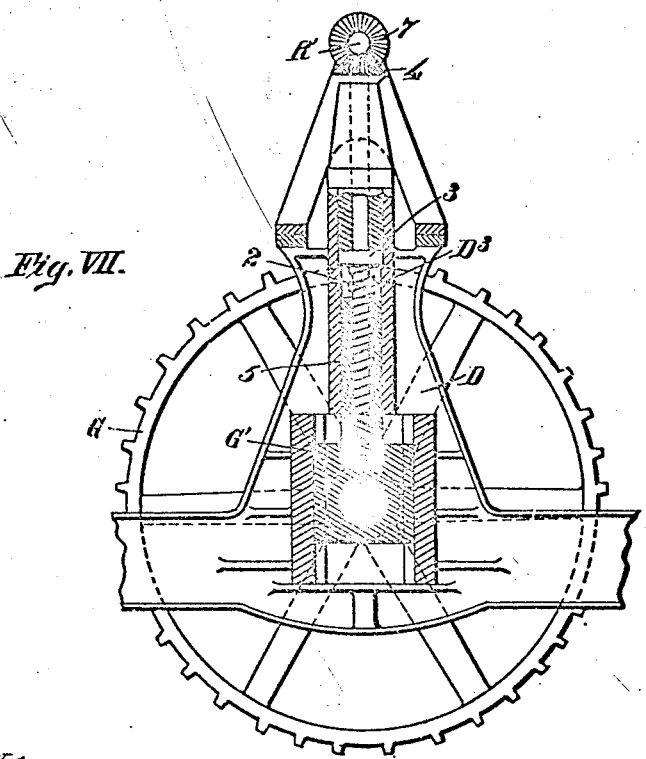
Fig. VII.
Witnesses
Inventor

UNITED STATES PATENT OFFICE.

CHARLES GILBERT HAWLEY, OF CHICAGO, ILLINOIS.

AUTOMATIC SHOVELING-MACHINE.

No. 895,457.  Specification of Letters Patent.  Patented Aug. 11, 1908

Application filed October 26, 1906. Serial No. 340,685.

*To all whom it may concern:*

Be it known that I, CHARLES GILBERT HAWLEY, a citizen of the United States, and a resident of Chicago, in the county of Cook and State of Illinois, have invented a certain new, useful, and Improved Automatic Shoveling-Machine, of which the following is a full, clear, and exact description, such as will enable others skilled in the art to which it appertains to make and use the same.

My invention relates to machines for moving loose material, such as sand, coal, ore and the like, and has particular reference to improvements in machines of that class known as automatic shovels or loaders employed for loading loose material into wagons, cars or other receptacles.

The object of my invention is to provide a relatively small compact, portable machine that shall be capable of taking loose material from the ground, elevating it a sufficient distance and discharging it into a suitable receptacle.

The particular objects of the invention are to provide an automatic shoveling or loading machine which shall be of less weight than other machines of the same capacity, which shall occupy less ground space and be of less height; which may be operated with less power, and which may be easily and accurately controlled in operation.

The objects relating to the details of construction of such machine are, briefly, to provide an automatic shovel in which the material after being lifted from the ground, shall be carried bodily to a higher point instead of being pushed upwardly upon an inclined surface as in other machines, my purpose in this regard being to avoid frictional losses and thereby lessen the expenditure of energy;—further to provide a machine wherein the shoveling member shall be located at the lower forward end of the machine and shall be confined to that part of the machine in contradistinction to those loading machines in which is used an endless inclined conveyer, equipped with heavy shoveling wings or arms, to the end that the shoveling portion or member of the loader may be of small size and of light weight;—further to provide a shoveling machine wherein the elevator or conveyer shall be uppermost and shall serve to cover and protect the motor and driving mechanism, it being especially desirable that such a machine shall be of minimum height and that the center of gravity thereof shall be as low as possible for sake of stability;—further to provide a machine of the character outlined which shall be self-propulsive and which may be operated and controlled by a single person stationed upon the machine;—further to provide an automatic loader or shovel in which the elevating mechanism shall be distinct from the digging or shoveling mechanism proper and which shall be so constructed that said mechanisms may be operated independently, and, if desired, at different speeds; and further to provide a machine of the class described which may be constructed, operated, and kept in repair at less cost than others.

Still further objects of my invention will appear hereinafter.

Broadly defined, my invention comprises an automatic shovel or loading machine which is characterized by a rotary shovel or winged rotor adapted to shovel loose material from the mass or pile to be moved; and an inclined carrier or conveyer arranged to receive the material from said rotor at a point close to the ground and to elevate it into a car or the like, or upon another conveyer in case the material is to be carried to a distant point.

My invention also consists in the various novel constructions and combinations of parts hereinafter described and particularly pointed out in the claims.

My invention will be more readily understood upon reference to the accompanying drawings, forming a part of this specification, and in which Figure I is a side elevation of a machine embodying my invention; Fig. II is a plan view thereof; Fig. III is a front elevation of the machine, on an enlarged scale; Fig. IV is a similar view with the rotor, shoe and conveyer removed; Fig. V is a plan view of the rear portion of the machine, illustrating the driving and controlling mechanism, the conveyer and its frame being removed; Fig. VI is a section on the line VI—VI of Fig. I, the same being shown on an enlarged scale and the wings of the rotor being removed; and Fig. VII is a detail view illustrating the means employed for raising and lowering the forward end or shoe of the machine.

In these drawings I have illustrated a preferred embodiment of my invention, but it will be evident that the essential features of the invention may be embodied in a shoveling machine which will be quite different in general appearance and in details of construction.

The principal members of the machine herein illustrated are, a low frame which is mounted on suitable propelling and steering wheels; a stationary shovel portion or shoe arranged at the forward end of the frame and preferably constituting a rigid element thereof; a rotor or multiple rotary shovel mounted upon said shoe; an inclined conveyer arranged on said frame and having its lower end beneath the upper portion of said shoe, and a motor or driving mechanism arranged upon the rear end of said frame, preferably beneath said conveyer, for operating said rotor and said conveyer, and for driving or moving the machine as a whole.

The frame of the machine comprises a rigid structure composed of standard channel or I-beams, A—A, an arch-bar, B, a bed plate, C, traction wheel frames, D—D, and the shoe, E. The parts B, C, D and E are preferably metal castings, being of irregular shapes. The frame is mounted upon the steering wheel or wheels, F, arranged beneath the arch-bar, B, and upon wheels, G—G within the frames, D—D. The driving motor here shown as an electric reversible motor, H, is placed upon the bed plate, C and the whole of the mechanism employed for driving the movable elements of the machine and for controlling the operations thereof is likewise located upon said bed-plate, C. The rotor, I, is mounted upon the shoe, E, and is provided with a plurality of arms, adapted to sweep the material from the shoe, E. The conveyer which I prefer to employ for elevating the material from the rotor is preferably a troughing belt, J mounted upon a frame, K, of well-known construction and occupying an inclined position upon the frame with its lower end beneath the upper edge, E', of the shoe, and its upper end extending rearwardly beyond the rear end of the frame to overhang a car or bucket or a second conveyer, L, shown in Fig. I.

In operating the machine the motor is first utilized to drive the shoe or shovel proper into the material,—coal, ore, or the like, after which the rotor may be started into rotation to sweep the material upward upon the lower end of the conveyer belt, which being also driven by the motor, carries the material upward and discharges it at the rear end of the machine. The levers M, N, O, shown in Figs. I and II of the drawings, together with the steering wheel, P, and the controller, Q, enable the man standing upon the frame at the side of the conveyer to operate the machine and control the action of its parts as required in the course of the work. By means of a lever, R, the operator is enabled to raise and lower the shoe as required by the nature of the work to be done and the surface of the ground operated over.

The steering wheel, F, is preferably divided into two small wheels, mounted on a single shaft or yoke and a center pin F' is held in the central bearing, B', on the arch-bar, B. A worm, D', on the staff, D'', engages a worm wheel, F''', on the center pin, F', enabling the operator to turn the wheel, F, and steer the machine.

Each frame, D, preferably comprises two castings, inclosing respective traction wheels, G, and providing pedestals or guides, D''', for the journal boxes, G', in which the shafts of the wheels, G, are held. The upper portions of the frames, D, constitute jack standards, G'', in which screw jacks, or equivalent devices, $D^3$ are arranged. The stationary member of each jack comprises a vertical screw, 2, having a frame-sustaining collar, 3 and provided with a bevel gear, 4, at its upper end. The movable member, 5, of the jack is internally threaded to receive the screw, 2, and is non-rotatively fixed upon or with relation to the respective journal box, G'. By operating the four jacks, the frame of the machine may be raised and lowered upon the traction wheels. For operating them simultaneously, I employ a single shaft, R', mounted in bearings, 6—6 on the upper ends of the frames, D, and provided with bevel gears, 7, meshing with the gears, 4, of the jacks. The operating lever, R, is connected with the shaft, R', by a reversible ratchet device, R'', whereby the shaft, R, may be turned in either direction to raise or lower the jacks.

The frame members, A, have their forward ends secured between the parts of the frames, D, and their rear ends riveted or bolted to the ends of the arch bar B. The bed plate, C preferably rests upon the lower flanges of the beams, A—A, to which beams it is rigidly secured. The shoe, E, is provided with rearwardly extending arms, E', bolted or riveted to the frame, D, whereby the shoe is sustained. It is not absolutely necessary that the shoe shall be rigidly attached to the frame or that the frame shall be vertically movable as a means of elevating the shoe, as it will be obvious that the heavy shoe may have its own sustaining wheels or rollers and that the latter and their bearings may be so constructed as to enable the desired adjustment of the shoe. The construction of such a shoe and its manner of operation is so obvious that I have not deemed it necessary to illustrate the same in detail.

The shovel or shoe herein shown is a metal casting rigidly but detachably secured to the frame of the machine and characterized by two conical surfaces, $E^2$ and $E^3$. The surface, $E^2$, is a section of an inverted obtuse cone, intersecting the cone $E^3$, at the line, $E^4$. The cone, $E^3$ is truncated at a point near its base and is closed across the top by a wall, $E^5$, best shown in Fig. VI. The lower part of the inverted cone, $E^2$, is cut away upon the line of intersection with a horizontal plane, (see line, $E^6$) forming a gap or intake space in front of and at the base of the smaller central cone, $E^3$. This space preferably extends inwardly to the base of the small cone, $E^3$ but may be of less depth in machines which are especially designed for certain free running material. The cones forming the shoe are inclined or tilted forward with the result that the rear side of the shoe is elevated sufficiently to admit the lower end of the conveyer, J, beneath the shoe. The material is swept upward from the gap, X, in the shovel by the wings or arms of the rotor and is discharged over the rear edge, $E^x$, of the shoe. Arms or wings, $E^7$, formed upon or attached to the rear side of the shoe and an abrupt inclined wall, $E^8$, which drops from said edge, $E^x$, form a receiving pocket Y whereof the conveyer, J, forms the bottom. The conveyer operates at comparatively high speed and carries away the material as rapidly as it is deposited in said pocket. I prefer that the walls, $E^2$, $E^3$ and $E^5$ of the shoe shall be integral, and further in casting this shoe I preferably core out the lower portion thereof to form the gear housing, $E^9$ and $E^{10}$; also the side walls, $E^{11}$ and $E^{12}$ and the front wall, $E^{13}$, which latter will be referred to again herein. The intake or upwardly inclined side, $E^2$, of the shoe is preferably provided with a more abruptly inclined marginal portion, $E^{2'}$, which serves to retain the material upon the shoe.

The rotor comprises a plurality of wings, $I'$, and a truncated cone or substantially conical part, $I^2$, which latter may be considered an extension of the central cone, $E^3$, and has a bottom flange, $I^3$, overhanging the cone, $E^3$, to close the joint between the stationary and rotating cones. The wings, $I'$ take their form from the angle between the cones, $E^2$ and $E^3$. They are attached to the rotary cone or hub, $I^2$ and extend downwardly therefrom substantially into contact with the surfaces of the shoe. If desired, the wings may be integral with the part, $I^2$, but for various reasons I prefer that they shall be separate parts, readily attachable to or detachable from the cone or hub, $I^2$. As shown in Figs. II, III, and VI, each wing is provided with a perpendicular portion, $I^3$, and is strengthened by an integral fin or brace, $I^4$. Upon the base provided by the portion, $I^3$, I form two bulbous ribs, $I^5$, which fit similarly formed grooves or cavities, $I^6$, in the portion, $I^2$. Each wing is thus slidably interlocked with the rotary cone or hub; little labor is involved in assembling these parts or in removing a broken wing from the hub. A special advantage of this construction is that each wing is free to move vertically in the hub at times when a descending wing strikes squarely upon the top of a piece of ore or the like lying between the gap of the shovel, a not infrequent occurrence, which otherwise would result in either stopping the rotor or damaging the same. The rotor as a whole is feathered upon a heavy upright shaft, $I^7$, held in a central bearing, $E^{14}$, in the cone top, $E^5$. (See Fig. VI.) $I^8$ represents the feather referred to; this preferably is the only means of connection between the driving shaft, $I^7$, and the rotor, hence the rotor as a whole is vertically movable upon its shaft and may be readily lifted therefrom. A lubricator, $I^9$, on the upper end of $I^7$, and communicating with channels in said shaft supplies grease or oil to the bearings of the shaft. A cap $I^{10}$, on the hub, $I^2$, excludes dust from the rotor bearings.

The lower end of the shaft, $I^7$, is equipped with a large gear wheel, $I^{11}$, and the rotor is driven by a pinion, $T'$, on the cross shaft, $T^2$, in the lower part of the shoe. The lower end of the cone, $E^3$ is closed by a flanged disk, $E^{15}$, suitably secured thereto and containing bearings for the shaft, $T^2$. The shaft has other bearings in the housing, $E^9$ and $E^{10}$, and its ends extend into said housing. (See dotted lines in Figs. I and II and full lines in Fig. VI.) The power of the motor is communicated to the rotor through the longitudinal shaft, T, and worm gearing comprising a worm, $T^3$, on the shaft T, and a worm gear, $T^4$, on the shaft, $T^2$. The gears, $T^3$ and $T^4$, are inclosed in the housing, $E^9$, and said housing being partly filled with lubricant, said gears and the shaft bearing in the housing are effectually lubricated.

It will be noted that the descending side of the shoe terminates in an abrupt front wall, $E^{13}$, and it will be obvious that at the moment that a rotor wing passes this point, the wing is a considerable distance above the surface which is swept by the rotor. To prevent the lodgment of large chunks of ore, coal or the like against the wall, $E^{13}$, and hence beneath the descending wings, I employ a reciprocating member, V, termed a "kicker." This projects through an opening in the face, $E^{13}$; it preferably swings from a center, $V'$, beneath the shoe, and is operated by a link, $V^2$, and a crank, $V^3$, which latter is driven by gears, $V^4$—$V^5$, arranged at the end of the shaft $T^2$, within the housing, $E^{10}$. Obviously the kicker, V, may be arranged to reciprocate in any desired manner and its structure may be readily modified. Its operation is timed in such manner that the kicker moves forward and then returns just before the arrival of a rotor wing above it. Thus the space in advance of the descending wing is constantly cleared and the material is properly gathered in the gap of the shoe ready to be picked up by the rotor wings. When relatively fine material is being handled by the machine the clearing device or kicker may be thrown out of gear, but in handling coarse materials containing heavy chunks it is of great advantage to operate the kicker continuously. Experiments which I have conducted with wings which are pivotally mounted upon the hub of the rotor and which are actuated vertically by a cam located in the shoe demonstrate that it is entirely feasible to thus construct a rotor, and in such cases the kicker, V, may be dispensed with. But a rotor having pivoted wings necessarily contains a large number of jointed members and joints which are difficult to maintain, and while such a device may be readily employed upon the inclined shoe of my machine, I much prefer a rotor of the construction illustrated; nevertheless, certain materials which are not gritty admit of the use of a pivoted wing rotor, and I desire it to be understood that I distinctly reserve the subject-matter herein disclosed but not shown in the drawings for a separate application for patent.

The shaft, T, which serves as a connection between the motor and the rotor, is supported in suitable bearings upon the bed-plate, C; a friction clutch, $T^5$ is interposed in the shaft, T, which is in two sections. This friction clutch is operated by means of the lever, M, and by reason of its use upon the high speed shaft, T (note the great reduction between the shafts T and $T^2$) may be of small size, a distinct advantage in constructing a machine of this character. The shaft, T is driven directly from the motor, H, by sprocket gears and a belt, $T^6$, as shown in Figs. I, II and V. By disengaging the members of the clutch, $T^5$, the rotor may be disconnected from the motor; the further offices of the clutch, $T^5$, are to permit the motion driven section thereof to slip in case the rotor encounters chunks of material thereby avoiding breakages; and to permit the rotor to be pulsated to dislodge heavy masses or to start slowly, either of which operations may be accomplished by manipulating the clutch lever, M. By reversing the motor, H, which may be accomplished by the controller, Q, the rotor may be turned in the reverse direction—but this is rarely necessary.

U, represents the conveyer driving shaft which is operated by a chain belt, U', extending across from the main driving section, $T^7$, of the shaft, T; $U^2$ represent change-speed gears, operated by the lever, O, and whereby the shaft, U, may be stopped and started and also operated at two different speeds. At times it is desirable to stop the rotor and work the conveyer at low speed as when very heavy masses have been thrown upon the conveyer by the rotor. At other times the conveyer is operated at full speed. The foregoing is equivalent to saying that I have found it advantageous to construct the conveyer in order that it may take care of the material furnished to it by the rotor under ordinary conditions and to operate the conveyer independently when made necessary by heavy loads rather than to construct the conveyer in such manner as to enable it to handle all loads under all conditions. As herein shown, the machine constitutes a flexible unit or mechanism capable of ready manipulation and control by the operator and adapted to meet all requirements acceptably and efficiently notwithstanding its small size and light weight. The shaft, $J^2$, is mounted in the frame, K, or, if desired, in the walls of the shoe, E, and is connected with the driving shaft, U, by means of a worm and worm gear, $U^3$—$U^4$. (See Figs. I and II.) The conveyer which I prefer to employ is a troughing belt driven by means of the lower conveyer pulley, $J^3$, on shaft, $J^2$, and running over troughing rolls or idlers, $J^4$. The upper end of the belt passes over a pulley or roller, $J^5$, which is adjustable upon the frame, K. $K^2$ and $K^3$ are the supports which sustain the conveyer.

The traction wheels, G, are driven by heavy chain belts, $G^3$—$G^3$, running over sprocket wheels arranged on the short shafts or axles of the traction wheels and upon the ends of the transmission shaft, S. This transmission shaft is held in bearings, S', on the bed-plate, and is made in two sections, which are connected by differential gearing, $S^2$, the main portion of which is a worm gear. Meshing with this worm gear is a worm, $S^3$, provided on the inclined shaft, $S^4$ that is connected with the motor by large and small bevel gears, $S^5$ and $S^6$, a clutch, $S^7$, being interposed on the motor shaft. This clutch, $S^7$, is operated by means of the lever, N, and by throwing the same into engagement with the motor the machine may be moved forward. Reverse motion of the machine may be obtained by reversing the motor, H. As the traction wheels are driven by a worm gearing it is obvious that the machine may be driven forward with great force as is frequently required to drive the shovel beneath the pile of material to be handled. An advantage attaching to the worm gear drive is that the machine is locked in every position and no brake mechanism is required thereon. The same advantages will be apparent in the cases of the rotor and the conveyer, neither of which can be affected by the load when disconnected from the motor.

I have herein shown both the rotor and the conveyer as driven from points beneath the shovel or shoe. This construction is practicable in large sizes of the machine, and for a number of obvious reasons is preferred, but I desire it to be understood that these mechanisms may be driven from points above the same, and this method of driving them is most desirable in machines of small dimensions. The operation of my novel shoveling machine or automatic loader is as follows:

The machine is advanced to the position at which it is to begin work by coupling the motor to the forward traction wheels and by guiding the machine by the steering device as described. When it has reached the proper position, the clutch, $S^7$, representing the traction wheels, is thrown out, bringing the machine to a stop and, through the medium of the worm gearing, locking the machine so that it can move neither forward nor backward until again propelled by the motor. At this time the shoe, E, is lowered and will have been driven into or beneath the pile of material attacked.

In operating the machine upon free sliding or free loading materials, the shovel may be driven well into the pile and the shoe may be lowered by means of lever, R, until it rests firmly on the ground, in which position, by reason of its weight it effectually anchors the machine. Obviously, however, the shoe may be held at a fixed distance from the ground and its elevation changed from time to time according to the surface traversed. When the machine has been brought to a stop or while it is still in motion the conveyer is started by the throwing in of one of the clutches of the change gear, $U^2$,—usually that which imparts the higher speed to the conveyer. After the conveyer has been set in motion the rotor will be started by gradually or slowly throwing the clutch, $T^5$, into action. The wings of the rotor successively clear the space before the shoe, and deposit the material into the pocket of the conveyer, which latter being in movement, elevates the material and discharges it at the rear end of the machine. If the rotor meets too great resistance, the clutch, $T^5$, permits the automatic reduction of the speed of the rotor and the latter becomes capable of moving very heavy loads. If the mass engaged by a wing of the rotor is sufficient to stop the motor, the operator may pulsate or vibrate the rotor and thereby deliver successive dislodging shocks or blows upon the material until the rotor is free, this being accomplished by manipulating the clutch lever, N. Should the conveyer become overloaded, the rotor is stopped and the conveyer permitted to operate alone or at a reduced speed, as hereinbefore described.

As various modifications of my invention will readily suggest themselves to one skilled in the art, I do not confine the invention to the specific construction herein shown and described.

Having thus described my invention I claim as new and desire to secure by Letters Patent:

1. An automatic shoveling machine which is characterized by a winged rotor arranged for rotation upon an upright axis and adapted to sweep the ground, and an inclined conveyer adapted to receive material from said rotor at a point close to the ground and to elevate the material to the point of discharge, substantially as described.

2. An automatic shoveling machine, comprising a wheeled frame, in combination with a shovel or shoe carried thereby, and having a receiving gap in its edge, a winged rotor on said shovel, said rotor being revoluble on an upright axis and adapted to sweep the ground at the gap of the said shoe and to slightly elevate material received thereby, and means for conveying away the material elevated by said rotor, substantially as described.

3. An automatic shoveling machine, comprising a wheeled frame, in combination with an inclined conical shovel or shoe thereon, a winged rotor upon said shoe and revoluble upon a substantially upright axis, to elevate material from the ground to the upper edge of said shoe, and means for receiving and conveying away material from the upper edge of said shoe, substantially as described.

4. An automatic shoveling machine, comprising a wheeled frame, in combination with an inclined shovel or shoe thereon, a winged rotor upon said shoe and revoluble upon a substantially upright axis, to elevate material to the upper edge of said shoe, a pocket formed at the upper edge of shoe to receive said material, and a conveyer forming the bottom of said pocket to take the material therefrom, substantially as described.

5. In an automatic shoveling machine, a suitably supported shoe or shovel proper having a conical, inclined upper face, in combination with a winged rotor fitting said shoe and revoluble about a substantially upright axis on said shoe, to elevate material from the ground to the upper edge of said shoe and an endless belt conveyer for receiving the material from said shoe, substantially as described.

6. In a shoveling machine a shoe or shovel proper, in combination with a rotor mounted thereon, revoluble on an upright axis and comprising a hub and a plurality of shoveling wings rigidly fixed thereon and a conveyer to receive material therefrom, substantially as described.

7. In a shoveling machine a shoe or shovel proper having an inclined, conical upper surface, an upright shaft centrally located in said shoe, a winged rotor mounted thereon and fitted to said shoe, means for revolving said rotor, and means for conveying material away from the upper edge of said shoe or shovel, substantially as described.

8. In a shoveling machine, an inverted-cone-like shoe or shovel proper forwardly inclined and having a receiving gap in its forward edge and a discharging gap in its rear upper edge, in combination with a winged rotor revolubly mounted on said shoe and in shape conforming thereto, substantially as and for the purpose specified.

9. In a shoveling machine, an inverted-cone-like shoe or shovel proper forwardly inclined and having a receiving gap in its forward edge and a discharging gap in its rear upper edge, in combination with a winged rotor revolubly mounted on said shoe and in shape conforming thereto, an inclined conveyer arranged to receive material from said shoe, and means for driving said rotor and said conveyer, substantially as described.

10. A shoveling machine comprising a wheeled frame, in combination with an inclined shovel or shoe at the forward end thereof, means for raising and lowering said shoe, a winged rotor revoluble upon an upright axis, and an inclined conveyer provided on said frame to receive material from said shoe, substantially as described.

11. In an automatic shoveling machine, a forwardly inclined concave shovel having a discharge gap in its upper edge, in combination with a relatively convex winged rotor mounted on said shovel and adapted to sweep material horizontally and upward into said gap, and a conveyer entering said gap to remove material therefrom, substantially as described.

12. In an automatic shoveling machine, a concave inclined shoe or shovel proper containing a central conical portion, in combination with an upright shaft in the latter, a hub mounted on said shaft above said central conical portion of the shoe, and shoveling wings attached to said hub, substantially as described.

13. In an automatic shoveling machine, a concave inclined shoe or shovel proper, in combination with an upright shaft centrally located therein, a hub mounted on said shaft and shoveling wings detachably secured to said hub, substantially as described.

14. In an automatic shoveling machine, an inclined shoe or shovel proper, in combination with an upright revoluble shaft, a hub located on said shaft, and a plurality of shoveling wings slidably interlocked with said hub and normally rigid thereon, substantially as described.

15. In an automatic shoveling machine, an inclined shoe or shovel proper, in combination with a winged rotor revoluble thereon, and a kicker provided at the lower edge of the shoe for clearing the same in advance of the rotor wings, substantially as described.

16. In an automatic shoveling machine, an inclined concave shoe or shovel proper having a receiving gap in its lower end or edge, in combination with a central upright shaft, a winged rotor mounted thereon and adapted to sweep said gap and elevate material upon said shovel, and a kicker operable in said gap, substantially as described.

17. In an automatic shoveling machine, an inclined shovel, in combination with a mechanism having shoveling wings which descend upon one side of said shovel and elevate material upon the other side thereof, and a kicker operating at the lower end of the shovel in advance of each descending wing, substantially as described.

18. In an automatic shoveling machine, an inclined shovel, in combination with a mechanism having shoveling wings and operating upon said shovel, an upright shaft for actuating said mechanism, and means beneath the shovel at the lower end of said shaft for rotating the same, substantially as described.

19. In an automatic shoveling machine, an inclined shovel, in combination with a mechanism having shoveling wings and operating upon said shovel, an upright shaft for actuating said mechanism, means beneath the shovel at the lower end of said shaft for rotating the same, and a kicker at the lower end of said shovel and actuated by said means, substantially as described.

20. In an automatic shoveling machine, an inclined concave shovel or shoe, in combination with a centrally located forwardly inclined shaft therein, a transverse shaft beneath the shovel for driving said inclined shaft, means behind the shovel for actuating said transverse shaft, and a suitable rotor mounted upon said inclined shaft, substantially as described.

21. In an automatic shoveling machine, a wheeled frame, in combination with a forwardly inclined shoe or shovel proper rigidly attached to and carried by said frame, means for raising and lowering said frame on its carrying wheels to adjust said shoe, an inclined conveyer on said frame, extending from said shoe to a higher point, a suitable rotor operable upon said shoe, and means upon said frame for driving said rotor and said conveyer, substantially as described.

22. In an automatic shoveling machine, a wheeled frame, in combination with an inclined shoe or shovel proper rigidly attached to and carried by said frame, a winged rotor operable on said shoe, an inclined conveyer rigidly mounted on said frame and extending from said shoe to a higher point above the rear end of said frame, and means on said frame for driving certain wheels thereof and for driving said rotor and said conveyer, substantially as described.

23. In an automatic shoveling machine, a wheeled frame, in combination with an inclined concave shoe or shovel proper, a winged rotor fitting and operable on said shoe, said shoe being adapted to sweep the ground, an inclined conveyer mounted on said frame and extending from a point below the upper edge of said shoe to a point above the rear end of said frame, and means on said frame beneath said conveyer for operating said rotor and conveyer and for propelling the machine as a whole, substantially as described.

24. An automatic shoveling machine comprising a wheeled frame, in combination with an inclined concave shoe or shovel proper, an inclined conveyer extending upward therefrom and supported on said frame, a cone-like winged rotor adapted to sweep material from the ground upon said shoe, and a rotor, conveyer and machine driving mechanism mounted on said frame beneath said conveyer, substantially as described.

25. An automatic shoveling machine comprising a low horizontal frame, in combination with a steering wheel and traction wheels on which said frame is mounted, an inclined conveyer arranged on said frame and extending close to the ground at the forward end thereof, and means at said forward end for sweeping material upon the lower end of said conveyer, substantially as described.

26. An automatic shoveling machine comprising a low horizontal frame, in combination with a steering wheel and traction wheels on which said frame is mounted, an inclined conveyer arranged on said frame and extending close to the ground at the forward end thereof, means at said forward end for sweeping material upon the lower end of said conveyer, and motor mechanism upon the frame beneath the conveyer for driving said means, said conveyer and said traction wheels, substantially as described.

27. An automatic shoveling machine comprising a wheeled frame, in combination with an inclined shoe or shovel proper at the forward end of said frame, a winged rotor mounted for rotation upon an upright axis and adapted to sweep material upwardly upon one side of said shoe, and a troughing belt occupying an inclined position on said frame and having its lower end beneath the upper edge or end of said shoe, substantially as described.

28. In an automatic shoveling machine, a wheeled frame, in combination with a troughing conveyer belt occupying an inclined position on said frame and at the forward end extending close to the ground, a winged rotor revoluble on an upright axis and adapted to sweep the ground, for throwing material upon the lower end of said belt, and means upon said frame for driving said rotor and said conveyer at different speeds, substantially as described.

29. An automatic shoveling machine comprising a wheeled frame, in combination with an inclined shoe or shovel proper at the forward end thereof, a winged rotor coacting with said shoe to slightly elevate material, an inclined conveyer on said frame, the lower end of said conveyer adapted to receive material from said shoe, and a secondary conveyer to receive material from the first-mentioned conveyer, substantially as described.

30. In an automatic shoveling machine, a wheeled frame, in combination with an inclined shoe or shovel proper at the forward end thereof, a winged rotor coacting with said shoe, an inclined conveyer provided on said frame to receive material from said shoe, and means for driving said rotor and said conveyer either simultaneously or independently, substantially as described.

31. In an automatic shoveling machine, a wheeled frame, in combination with an inclined shoe or shovel proper at the forward end thereof, a winged rotor coacting with said shoe, an inclined conveyer provided on said frame to receive material from said shoe, means for driving said conveyer at two different speeds, and other means for driving said rotor, substantially as described.

32. In an automatic shoveling machine, a wheeled frame, in combination with an inclined shoe or shovel proper at the forward end of said frame, a winged rotor coacting with said shoe, a conveyer for elevating material from the shoe, a motor, means for connecting the same with said conveyer, a gear reduction train connecting the motor with said rotor, and a slippable clutch interposed in said train near the motor, substantially as described.

33. In an automatic shoveling machine, a wheeled frame, in combination with an inclined shoe or shovel proper at the forward end of said frame, a winged rotor coacting with said shoe, an inclined conveyer upon said frame to receive material from said shoe, a motor mounted upon the rear end of said frame and adapted to drive said rotor, said conveyer and the machine as a whole, and means at the rear end of said frame for steering the machine and for controlling the action of its parts, substantially as described.

34. In an automatic shoveling machine, a wheeled frame, in combination with digging and elevating means provided thereon, a motor on the frame for driving said means, a differential transmission shaft on the frame, and connected with certain of the wheels thereof, gearing for driving said shaft, and means for coupling the same to said motor, substantially as described.

35. In an automatic shoveling machine, a wheeled frame, in combination with an inclined shoe or shovel proper at the forward end thereof, a winged rotor coacting with said shoe, a belt conveyer and its frame of less width than the first-mentioned frame and occupying an inclined position thereon to receive material from said shoe, a motor and gearing upon the rear end of the frame for driving said rotor and said conveyer and for moving the machine as a whole, and means upon the frame at the side of said conveyer whereby an operator riding upon the frame may control the action of the machine and its parts, substantially as described.

36. In an automatic shoveling machine, an elongated frame, in combination with an inclined shoe or shovel proper at the forward end thereof, a winged rotor mounted upon and coacting with said shoe, an inclined conveyer arranged upon said frame to receive material from said shoe, traction wheels adjacent to said shoe, means upon said frame for driving said traction wheels, said rotor and said conveyer simultaneously and at different times, and a steering wheel at the rear end of said frame, substantially as described.

37. In an automatic shoveling machine, a frame, in combination with an inclined concave shoe or shovel proper, an inclined conveyer to receive material therefrom, wings or pocket-forming sides extending from the shoe over the lower end of said conveyer, and a winged rotor conforming to the shape of said shoe and coacting therewith to elevate material to said conveyer, substantially as described.

38. In an automatic shoveling machine, a frame, in combination with an inclined shoe or shovel proper, a winged rotor conforming to the shape thereof and coacting therewith to elevate material as described, rotor driving means beneath said shoe, and lubricant pockets or cavities upon the under side of said shoe wherein said means operate, substantially as described.

39. In a machine of the class described, an endless conveyer and a rotor for gathering up loose material from the ground and depositing it upon said conveyer; in combination with means for driving said conveyer and said rotor independently of each other and at different speeds, substantially as described.

40. In a machine of the class described, an endless conveyer, in combination with an inclined winged member revoluble on an upright shaft for sweeping loose material from the ground upward to said conveyer and means for driving said conveyer and said rotary member at different speeds and for stopping said rotor while the conveyer remains in operation, substantially as described.

41. In a machine of the class described, an endless conveyer, in combination with a rotary shovel mounted on an upright axis and provided with a plurality of detachable wings adapted to sweep the ground for gathering up and depositing material upon said conveyer, and means for driving said conveyer and shovel, substantially as described.

42. In a machine of the class described, a frame in combination with a concave shoe attached to the forward end thereof and having a gap in its forward edge, a rotary shovel mounted for coöperation with said shoe, an endless conveyer extending beneath the upper edge of said shoe and means for driving said shovel and said conveyer, substantially as described.

43. In a machine of the class described, a frame in combination with a shoe attached to the forward end thereof, a rotary feeder mounted for coöperation with said shoe, an endless conveyer, means for raising and lowering the forward end of the machine, and means for driving said conveyer and said feeder, substantially as described.

44. In a machine of the class described, an endless conveyer and a winged rotor, in combination with means for driving the same independently of each other, and means for varying the speed of the conveyer, while the rotor is in operation, substantially as described.

In testimony whereof, I have hereunto set my hand, this 22nd day of October, 1906, in the presence of two subscribing witnesses.

CHARLES GILBERT HAWLEY.

Witnesses:
F. G. KNIGHT,
M. SIMON.